(12) United States Patent
Ju et al.

(10) Patent No.: US 10,909,540 B2
(45) Date of Patent: Feb. 2, 2021

(54) USING FUZZY INFERENCE TO DETERMINE LIKELIHOOD THAT FINANCIAL ACCOUNT SCENARIO IS ASSOCIATED WITH ILLEGAL ACTIVITY

(71) Applicant: ENTIT SOFTWARE LLC, Sanford, NC (US)

(72) Inventors: Han Ju, Singapore (SG); Lakshmi Nagarajan, Singapore (SG); Shi Xing Yan, Singapore (SG)

(73) Assignee: Micro Focus LLC, Santa Clara, CA (US)

( * ) Notice: Subject to any disclaimer, the term of this patent is extended or adjusted under 35 U.S.C. 154(b) by 770 days.

(21) Appl. No.: 15/545,826

(22) PCT Filed: Feb. 24, 2015

(86) PCT No.: PCT/US2015/017296
§ 371 (c)(1),
(2) Date: Jul. 24, 2017

(87) PCT Pub. No.: WO2016/137443
PCT Pub. Date: Sep. 1, 2016

(65) Prior Publication Data
US 2018/0018670 A1    Jan. 18, 2018

(51) Int. Cl.
*G06Q 20/40*     (2012.01)
*G06Q 40/02*     (2012.01)
*G06N 5/04*      (2006.01)
*G06N 7/00*      (2006.01)

(52) U.S. Cl.
CPC ........ *G06Q 20/4016* (2013.01); *G06N 5/048* (2013.01); *G06N 7/005* (2013.01); *G06Q 40/02* (2013.01)

(58) Field of Classification Search
None
See application file for complete search history.

(56) References Cited

U.S. PATENT DOCUMENTS

| 7,721,336 B1 | 5/2010 | Adjaoute et al. |
| 8,145,562 B2 | 3/2012 | Wasserblat et al. |
| 8,458,069 B2 | 6/2013 | Adjaoute |
| 8,515,895 B2* | 8/2013 | Benson ............... G08B 13/196 706/52 |
| 10,432,605 B1* | 10/2019 | Lester .................... H04L 63/20 |

(Continued)

FOREIGN PATENT DOCUMENTS

KR    10-2013-0095548    8/2013

OTHER PUBLICATIONS

Heidarinia et al., An Intelligent Anti-Money Laundering Method for Detecting Risky Users in the Banking Systems, International Journal of Computer Applications (0975-8887) vol. 97—No. 22, Jul. 2014, pp. 35-39 (Year: 2014).*

(Continued)

*Primary Examiner* — Alan Chen

(57) ABSTRACT

A method includes receiving an alert representing that application of at least one rule to a scenario occurring with a financial account indicates that the scenario is consistent with illegal activity. The method includes, in response to the alert, using a fuzzy inference derived from activity of the financial account to determine a likelihood that the scenario is associated with illegal activity.

20 Claims, 6 Drawing Sheets

(56) References Cited

U.S. PATENT DOCUMENTS

| | | |
|---|---|---|
| 2002/0138417 A1 | 9/2002 | Lawrence |
| 2006/0212373 A1 | 9/2006 | Maxwell et al. |
| 2009/0182653 A1 | 7/2009 | Zimiles |
| 2010/0145836 A1 | 6/2010 | Baker et al. |

OTHER PUBLICATIONS

Raza et al., Suspicious activity reporting using dynamic bayesian networks, Procedia Computer Science 3 (2011), pp. 987-991 (Year: 2011).*
Khan et al., A Bayesian Approach for Suspicious Financial Activity Reporting, International Journal of Computers and Applications, vol. 35, No. 4, 2013, pp. 181-187 (Year: 2013).*
Barraclough et al., Intelligent phishing detection parameter framework for E-banking transactions based on Neuro-fuzzy, Science and Information Conference 2014, Aug. 27-29, 2014, pp. 545-555 (Year: 2014).*
"Effective Solution for the Detection of Persons Subject to Economic Sanctions and PEPs"; Sep. 22, 2014; http://www.nttdata-getronics.co.jp/en/img/solutions/oculus.pdf.
Chen, Y-T. et al.; "Fuzzy Computing Applications for Anti-money Laundering and Distributed Storage System Load Monitoring"; Jan. 27, 2011;http://johmathe.nonutc.fr/ressources/p.
Musthaler, L.; "Verafin Uses Fuzzy Logic and Ai to Fight Bank Fraud and Money Laundering"; May 27, 2011;http://www.networkworld.com/article/2177637/infrastructure-management/v.
Nezhad, F.S. et al.; "Fuzzy Logic and Takagi-sugeno Neural-fuzzy to Deutsche Bank Fraud Transactions"; Apr. 17-18, 2013;http://ieeexplore.ieee.org/stamp/stamp.jsp?arnumber=6556.
PCT; "International Search Report "; cited in PCT/US2015/017296; dated Sep. 30, 2015; 3 pages.

* cited by examiner

USING FUZZY INFERENCE TO DETERMINE LIKELIHOOD THAT FINANCIAL ACCOUNT SCENARIO IS ASSOCIATED WITH ILLEGAL ACTIVITY

BACKGROUND

A typical financial institution may have checks in place for purposes of ensuring that its accounts are not used to conduct illegal activities, such as money laundering or terror financing activities. These checks may involve the use of software that monitors account activity for suspicious activity.

DETAILED DESCRIPTION

Figure 1:
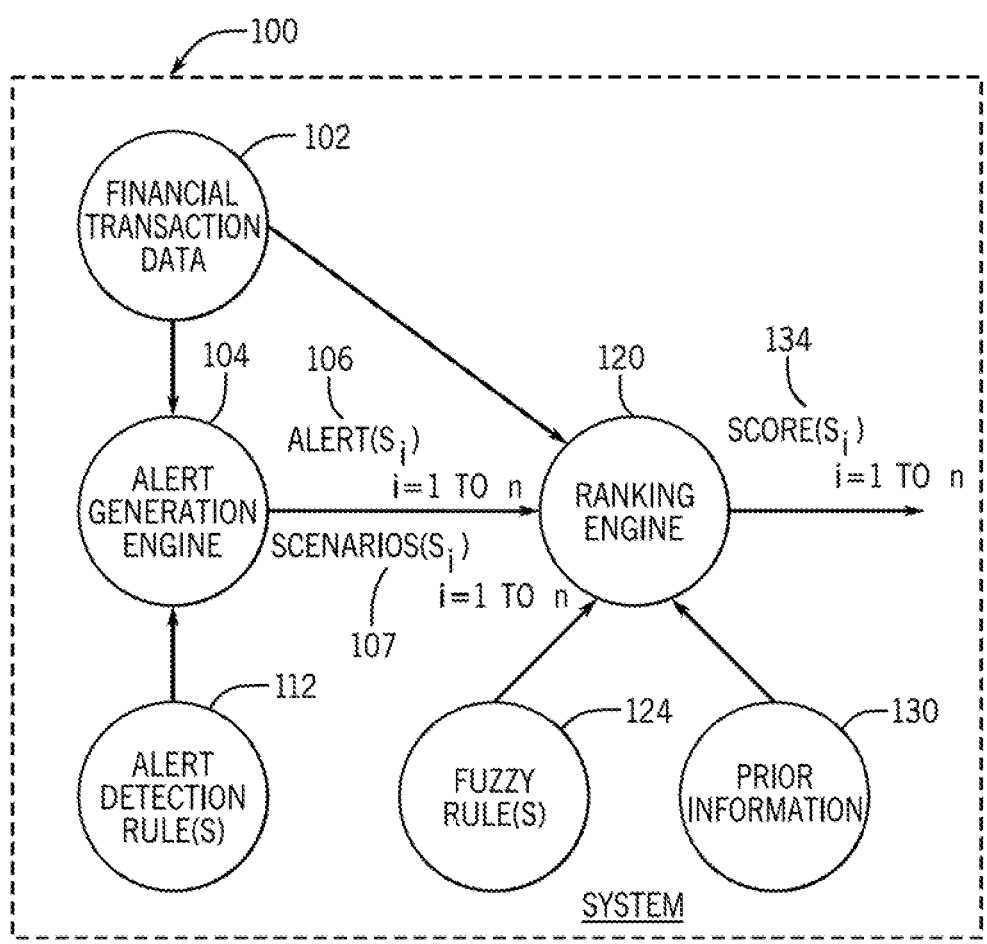
FIG. 1 is a schematic diagram of a fuzzy inference-based system to determine an illegal activity risk score for a financial account scenario according to an example implementation.

A financial institution (e.g., a depositary financial institution, such as a bank, savings and loan association or credit union, or a non-depositary financial institution, such as a brokerage firm, credit card company or investment company) may have checks in place for purposes of generating alerts to identify a suspicious account activity that is consistent with illegal activity (e.g., a money laundering operation or a terror financing operation). More specifically, the financial institution may have one or multiple software-based monitoring applications that evaluate historical account transactions against predefined risk assessment rules for purposes of generating alerts. A given alert identifies a corresponding account activity pattern (called a "scenario" herein) as being consistent with illegal activity. The scenarios that are flagged with alerts may be further evaluated by software applications for purposes of assessing risk scores for the underlying accounts so that risk officers of the financial institution may review the accounts that are considered to be the most at risk for involvement with illegal activity.

For example, a given risk assessment rule may specify that single transaction amounts are checked against a certain maximum amount, such as $10,000, and an alert is generated when the maximum amount is exceeded. It is noted that a given rule may involve multiple transactions. For example, another rule may specify that an alert is generated in response to the following scenario: an aggregate of transactions that occur over a predefined period of days exceeds a certain threshold. Other rules may be more complex and involve consideration of multiple variables (an aggregate credit balance, an aggregate debit balance, single transaction amounts, and so forth) and combination of such variables for purposes of defining when an alert is to be generated.

A high volume of alerts may be generated using the above-described approach, as financial accounts that are and are not involved with illegal activity are associated with transactions that cause alerts. For example, financial account transactions of a large business enterprise that is not involved with illegal activity may daily violate a rule that generates an alert for a single transaction amount exceeding $10,000. For purposes of sorting through the alerts to identify the accounts that are most likely to be involved with illegal activity, the financial institution may assign risk scores to the scenarios that are associated with the alerts so that the corresponding financial accounts may be accessed a risk score and ranked according to their risk scores. In this manner, a compliance officer or risk officer of the financial institution may then more closely examine the financial accounts that are associated with the higher rankings (i.e., closely examine the financial accounts that are deemed to be the most at risk for involvement with illegal activity).

One way to assign risk scores to financial account scenarios is through the use of Bayesian inference. In general, Bayesian inference uses prior information to determine a posterior probability, or likelihood, that a given scenario is involved in illegal activity, given that the scenario caused the generation of an alert. In specific examples discussed herein, it may be assumed that the illegal activity pertains to money laundering. However, in accordance with further example implementations, the illegal activity may take on other forms, such as activities related to financing terror operations.

Given a scenario that generates an alert, the Bayesian inference-derived probability of money laundering being engaged in this scenario may be described as follows:

$$P(ML|S_i)=P(S_i|ML)*P(ML)/P(S_i) \quad \text{Eq. 1}$$

where "$P(S_i)$" represents the probability of a scenario $S_i$ generating an alert across all transactions; "$P(ML)$" represents the probability that money laundering has occurred; "$P(S_i|ML)$" represents that given money laundering has occurred, the probability of a scenario $S_i$ generating an alert; and "$P(ML|S_i)$" represents the degree of belief, or likelihood, that money laundering has occurred given that scenario $S_i$ generated an alert.

Due to the general lack of money laundering records, it is possible that $P(S_i|ML)$ may not be accurately estimated through historical records. Therefore, the $P(S_i|ML)$ parameter in Eq. 1 may be specified by compliance officers to represent the importance of scenario $S_i$ and may otherwise be known as a "Bayes Weight" for $S_i$. After computing Bayes probabilities for the scenarios that generated alerts for a given financial account, a risk score for the account may be assigned as follows:

$$\text{account risk score}=\Sigma_{i=1}^{n}P(S_i|ML) \quad \text{Eq. 2}$$

where "n" represents the number of alerts for the account.

In accordance with example implementations that are disclosed herein, the likelihood that a given scenario (associated with an alert) is involved with illegal activity is determined based at least in part on a fuzzy inference that is derived from account activity. In this context, "fuzzy inference" refers to a fuzzy distribution or a parameter characterizing a fuzzy distribution, which is generated by applying fuzzy set theory to map one or multiple input variables (e.g., variables corresponding to characterizing financial data for a financial account) to one or multiple output variables (e.g., variables characterizing risks for illegal activity). In accordance with example implementations further described herein, fuzzy set theory is applied using a fuzzy rule, which defines one or multiple relationships between one or multiple input variables and one or multiple output variables. In contrast to digital logic, which uses a binary value that is either "true" or "false," a fuzzy set theory-based variable has an associated degree of truth/falsity.

As described further herein, the use of the fuzzy inference allows the degree by which a rule is violated to be taken into account when assessing a risk score for the corresponding scenario. In this manner, for the above-described rule in which the transaction amount is compared to the fixed threshold of $10,000, a scenario having a transaction amount of $10,000.01 has the same Bayesian weight as a scenario that has a transaction amount of $90,000. The fuzzy inference-based approach described herein produces different risk weights for these two transactions, in accordance with example implementations.

The fuzzy inference also, in accordance with example implementations, allows the application of an adaptive threshold for a given, specific financial account for purposes of taking into account the manner in which the specific account is used to conduct legal operations. For example, if a particular financial account of a relatively large business enterprise has a relatively high cash turnover every day, the enterprise may have many transactions over $10,000 in a given day but would not be considered to be conducting illegal activities. The use of the adaptive threshold inhibits false positive alerts for such an account, as compared to the mere use of a Bayesian-based risk assessment.

In accordance with example implementations, a given financial account may be assigned its own set of adaptive thresholds, which are determined from the historical behavior of the account. In this manner, deviations from historical account balances and other characterizing parameters of the financial account may be used to assessing risk scores for the account. For example, if a financial account has a relatively large deposit transaction that exceeds ten times of its standard deviation based on the historical records, and this relatively large deposit is followed by a relatively large withdrawal that also exceeds several times its historical standard deviation within a pre-defined period, then an alert is triggered.

The adaptive thresholds may not be suitable for all scenarios, for example, such as when the number of automated teller machines (ATMs) used is larger than three. In this case, the threshold is a small integer and may not be suitable for the adaptive threshold method.

Additionally, in accordance with example implementations, users may want to specify fixed thresholds for certain rules and/or for certain financial accounts, instead of the thresholds being adaptive. Enabling or disabling this feature may be subject to regulations, and in accordance with example implementations, any action that results in a change in the system settings are fully logged, including recording such information as the user name, time, action description, and so forth.

In accordance with example implementations, both Bayesian and fuzzy inferences are used to generate risk scores for scenarios for which alerts have been generated. In this manner, the fuzzy inference is used as a weight to the Bayesian inference described above in Eq. 1 so that, in general, if a single transaction exceeds a threshold by a relatively large amount, the account has a higher likelihood to be involved in illegal activity, and this likelihood is taken into account by the fuzzy inference. More specifically, in accordance with example implementations, for each scenario generating an alert, a corresponding fuzzy value is determined, a factor (called "$F_i$" herein) is determined from the fuzzy value, and the factor $F_i$ is used in conjunction with a Bayesian inference-derived weight for purposes of denoting the importance of the scenario, i.e., the likelihood that the scenario is associated with illegal activity, such as money laundering.

More specifically, in accordance with example implementations, Eq. 2 may be modified with a factor $F_i$ to generate a risk assessment score (called "Score($S_i$)") for a given scenario $S_i$, as described below:

$$\text{Score}(S_i) = F_i * P(S_i|ML) * P(ML)/P(S_i) \qquad \text{Eq. 3}$$

It is noted that in Eq. 3, the weight $P(S_i|ML)$ is, maintained such that users have the freedom to artificially scale the weights. Thus, in accordance with example implementations, an alert designates each scenario $S_i$ as a candidate that is consistent with illegal activity, and the Score($S_i$) is a risk score for that candidate. The resulting risk, score for the account may then be obtained by combining the risk scores for the candidates, as follows:

$$\text{account risk score} = \Sum_{i=1}^{n} \text{Score}(S_i) \qquad \text{Eq. 4}$$

In accordance with example implementations, one or more fuzzy rules are assigned to a given financial account to define how the fuzzy inference is generated for scenarios for the account for which an alert is generated. In this manner, for a given scenario, the assigned fuzzy rules for the account are applied to derive a fuzzy value (the fuzzy inference), and the fuzzy value is defuzzified to generated the factor $F_i$. As described further herein, in accordance with example implementations, the fuzzy rule is a linguistic rule that may be specified by a user, such as a compliance officer; allows the resulting fuzzy inference to take into account the degree to which the rule has been violated; and takes into account the manner in which the account has historically been used to conduct legal operations.

FIG. 1 depicts a system 100 for generating fuzzy inference-based scenario scores 134 for a given financial account, in accordance with an example implementation. The system 100 includes an alert generation engine 104, which applies one or multiple alert detection rules 112 to financial transaction data 102 to determine whether any of the rules have been violated. In accordance with example implementations, these rules 112 define non-adaptive, fixed thresholds for deciding when to generate scenario alerts 106. It is noted that although, in accordance with some implementations, the fixed thresholds may be defined by regulators and may allowed by the regulators to be changed, the fuzzy rule(s) 124, which are used to assess risk scores to flagged scenarios, may define adaptive thresholds, as described herein.

For scenarios 107 that are determined to violate the risk assessment rule(s) 112, the alert generation engine 104 generates corresponding alerts 116, where each alert 116 is associated with one of the scenarios 107. A risk ranking engine 120 of the system 100 applies the fuzzy rule(s) 124 as well as possibly applies prior information 130 for purposes of deriving fuzzy and Bayesian inferences that are used to determine a corresponding risk scores 134 for the scenarios 107. The risk ranking engine 120 may also, in accordance with example implementations, generate a risk score for the account by combining the scenario scores 134 and may, in accordance with some implementations, generate risk scores for multiple accounts and rank the accounts according to the account risk scores.

As an example of the definition and application of fuzzy rules, fuzzy rules may be created for a scenario that is defined as follows: IF TCT>x AND TDT>y THEN generate an alert, where "TCT" represents the total credit currency amount today, "TDT" represents the total debit currency amount today, and "x" and "y" represent threshold values. For purposes of applying the fuzzy rules, the variables (TCT and TDT for the example above) of the scenario are "fuzzified" by assigning the variables to corresponding membership functions. In accordance with example implementations, each membership function defines a range where each variable is considered "high" or "low," and the degree of high or low is quantified by a number in the range [0,1]. In accordance with further example implementations, other ranges, such as ranges that define where the variable is considered to be in another state (such as "medium" or "medium high," as examples) may be used.

The fuzzy rules define how the risk is evaluated. For example, for the example scenario defined above, the following fuzzy rules may be defined:

TABLE 1

| IF TCT is HIGH AND TDT is HIGH, THEN RISK IS HIGH | Rule 1 |
| IF TCT is LOW AND TDT is LOW, THEN RISK IS LOW | Rule 2 |

Figure 2:
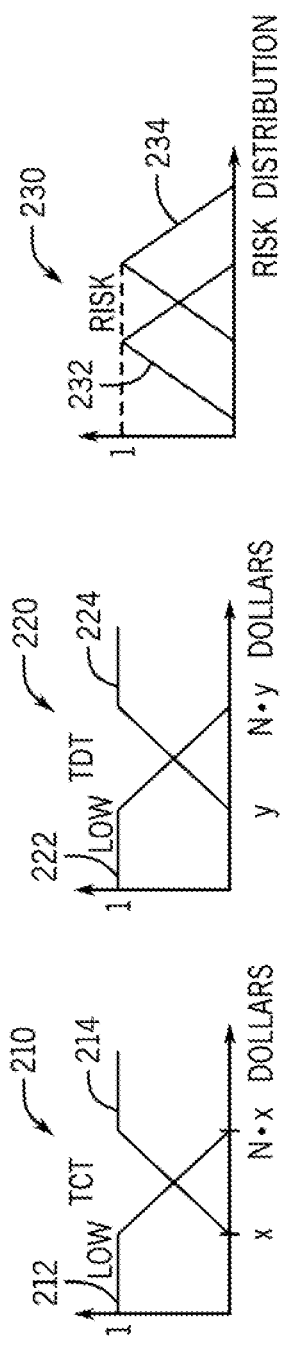
FIG. 2 is an illustration of the fuzzification of fuzzy rule variables and risks according to an example implementation.

As a more specific example, FIG. 2 illustrates fuzzification of the variables and risk for Rules 1 and 2 by defining example membership functions for TCT and TDT and example functions for the high and low risk levels. In this context, "fuzzification" refers to applying fuzzy set theory to one or multiple crisp values (such as logic values, integers and real numbers, for example) for purposes of converting the crisp value(s) into one or multiple grades of membership (i.e., fuzzy value(s)). In this manner, as illustrated at reference numeral 210 for the TCT variable, two membership functions 212 and 214 define the corresponding LOW and HIGH values for TCT: the membership function 212 defines the TCT variable for the fuzzy LOW value; and the membership function 214 defines the fuzzy HIGH value for the TCT variable. In this manner, the membership function 212 defines a range of dollars in which the TCT variable is considered to be low and the corresponding degree of low, and the membership function 212 defines a range of dollars in which the TCT variable is considered to be high and the corresponding degree of high.

As illustrated in FIG. 2, in accordance with example implementations, the membership function are piecewise-linear, and the starting and ending points are defined according to {−∞, threshold, N*threshold, +∞}. The values of the thresholds may be set to fixed thresholds or may be set to thresholds that are adapted to the specific financial account, depending on the particular implementation. "N" is a user-defined value, in accordance with example implementations, and represents a deviation from the threshold. Thus, the fuzzified TCT variable has a LOW membership function 212 that extends to a user-defined deviation (N) from the threshold x, and the HIGH membership function 214 extends from the threshold x to a user defined deviation (N) from the x threshold.

FIG. 2 further has an illustration at reference numeral 220 illustrating similar fuzzification of the TDT variable. In this manner, for this example, the TDT variable is compared to the threshold y and has corresponding LOW 222 and HIGH 224 membership functions.

The logic values for the risk are also fuzzified, as illustrated at reference numeral 230 in FIG. 2. In this regard, as defined by the fuzzy rules, evaluation of the TCT and TDT variables result in either a low risk defined by a low risk membership function 232 or a high risk defined by a high risk membership function 234. For this example implementation, the risk membership functions 232 and 234 are triangular, although other profiles may be used, in accordance with further example implementations.

Figure 3:
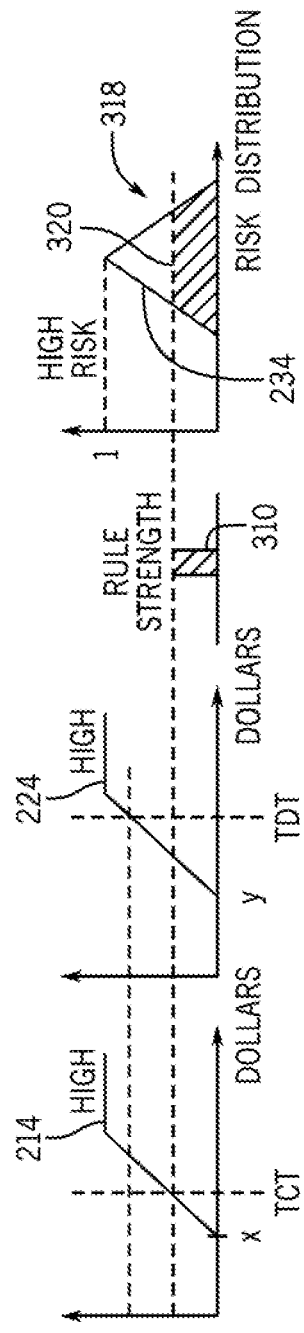
FIGS. 3 and 4 illustrate evaluations of fuzzy rules according to an example implementation.
Figure 4:
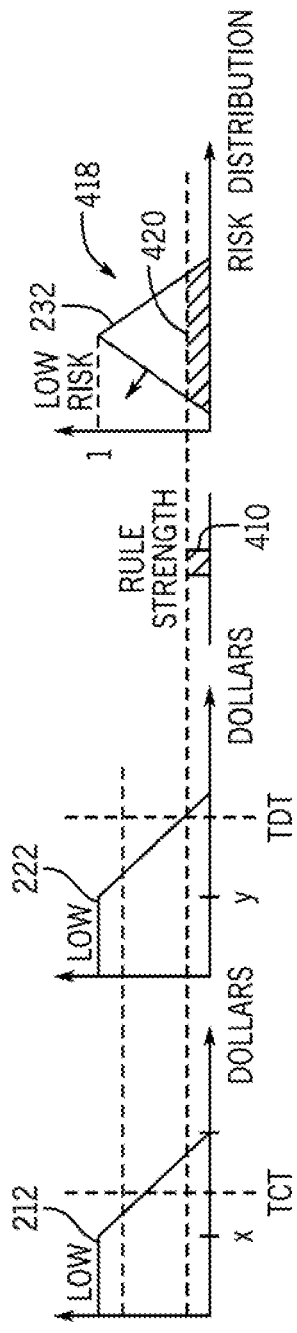

FIGS. 3 and 4 depict example applications of the fuzzy rules. In this manner, FIG. 3 depicts the application of fuzzy Rule 1 for given TCT and TDT dollars. It is noted that Rule 1 is evaluated based on whether TCT is HIGH and TDT is HIGH; and as a consequence, the dollar values for TCT and TDT are evaluated with respect to the HIGH membership functions 214 and 224, respectively. Due to the "AND" in Rule 1, the minimum of the values derived from the membership functions 214 and 224 are used for purposes of determining a rule strength 310. It is noted that if Rule 1 hypothetically contained an "OR," then the maximum of the membership function values would determine the rule strength. The rule strength 310 is then applied to the HIGH risk membership profile 234 to generate a corresponding result 318 for the application of Rule 1. As depicted in FIG. 3, the result 318 for Rule 1 results in a region 320 defined by the rule strength 314 and the profile 234.

In a similar manner, FIG. 4 depicts application of fuzzy Rule 2 to the membership functions 212 and 222 to produce a corresponding rule strength 410. The rule strength 410 is then applied to the LOW risk membership profile 232 to produce a corresponding fuzzy result 418, which, as illustrated at reference numeral 420 is defined by rule strength 410 and profile 232.

Figure 5:
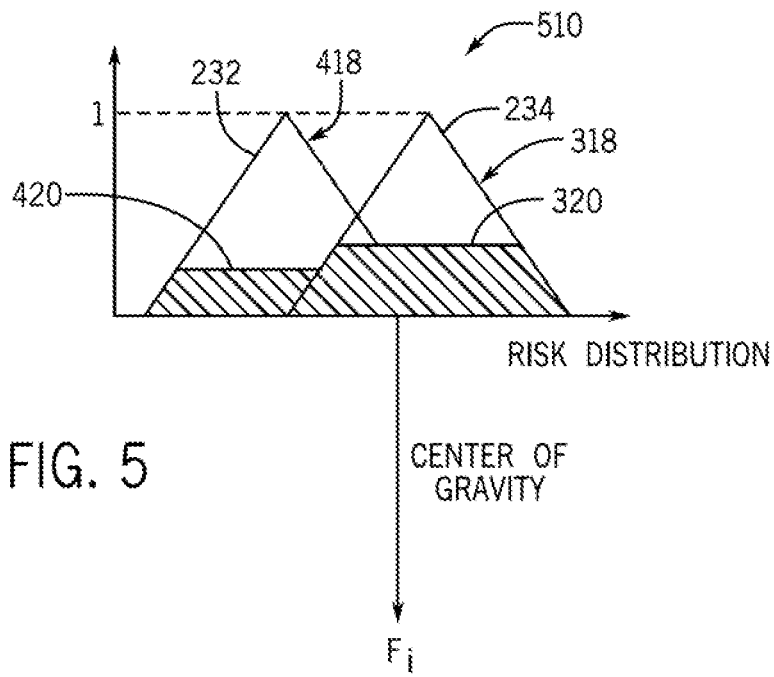
FIG. 5 illustrates defuzzification of a fuzzy output distribution according to an example implementation.

Referring to an illustration 510 of FIG. 5, the results 416 and 318 are combined to derive an output distribution, or fuzzy value, that represents a degree of belief that the evaluated scenario is the result of illegal activity. The fuzzy value is "defuzzified" to generate the factor Fi. In this context, "defuzzifying" generally refers to the inverse of fuzzifying, or applying fuzzy set theory to transform one or multiple grades of membership (i.e. a fuzzy value(s)) to one or multiple crisp values (such as, for example, a logic value, an integer or a real number). For the example of FIG. 5, the factor Fi is derived using a center of gravity defuzzification technique. It is noted, however, that other defuzzification techniques (a defuzzification technique based on the mean of the risk function that has the maximum value, for example) may be used, in accordance with further example implementations.

It is noted that ranking according to both fuzzy and Bayesian inferences may provide a significantly more detailed ranking as compared to a mere Bayesian inference-based ranking, as the techniques and systems that are disclosed herein consider the relationship between the parameters of a fuzzy rule (AND/OR) and also takes into account how much a transaction has violated a scenario. In comparison to the mere Bayesian inference-based technique, this makes the scenario weights dynamic and account specific. Therefore, the techniques and systems that are disclosed herein may greatly facilitate the relatively quick identification of highly suspicious accounts by compliance or risk officers and may significantly reduce the resource costs of financial institutions. Other and different advantages may be achieved, in accordance with further example implementations.

Figure 6:
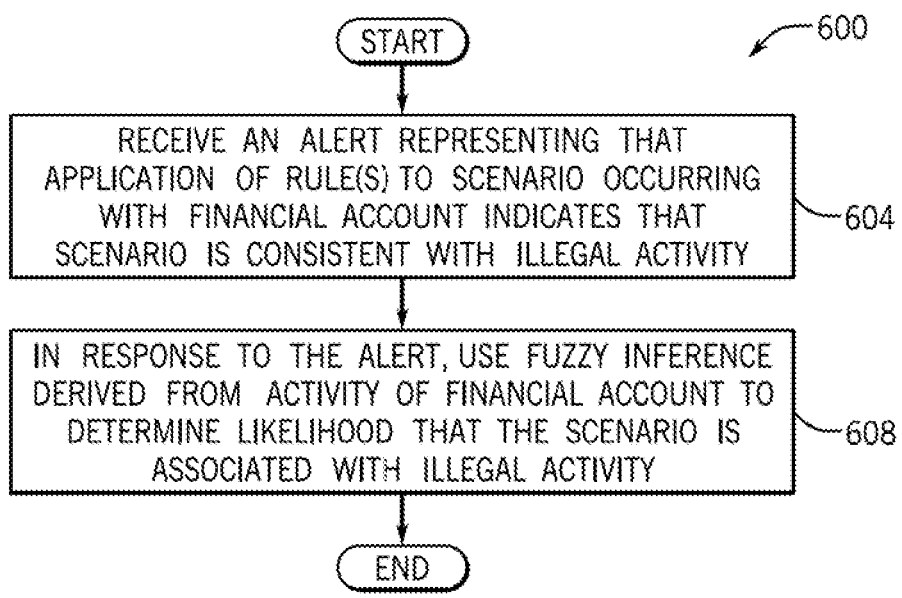
FIG. 6 is a flow diagram depicting a technique to use fuzzy inference to determine a likelihood that a financial account scenario is associated with illegal activity according to an example implementation.

Thus, referring to FIG. 6, in accordance with example implementations, a technique 600 includes receiving (block 604) an alert representing that application of at least one rule to a scenario occurring with a financial account is consistent with illegal activity. Pursuant to the technique 600, in response to the alert, a fuzzy inference derived from activity of the financial account is used (block 608) to determine the likelihood that the scenario is associated with illegal activity.

Figure 7:
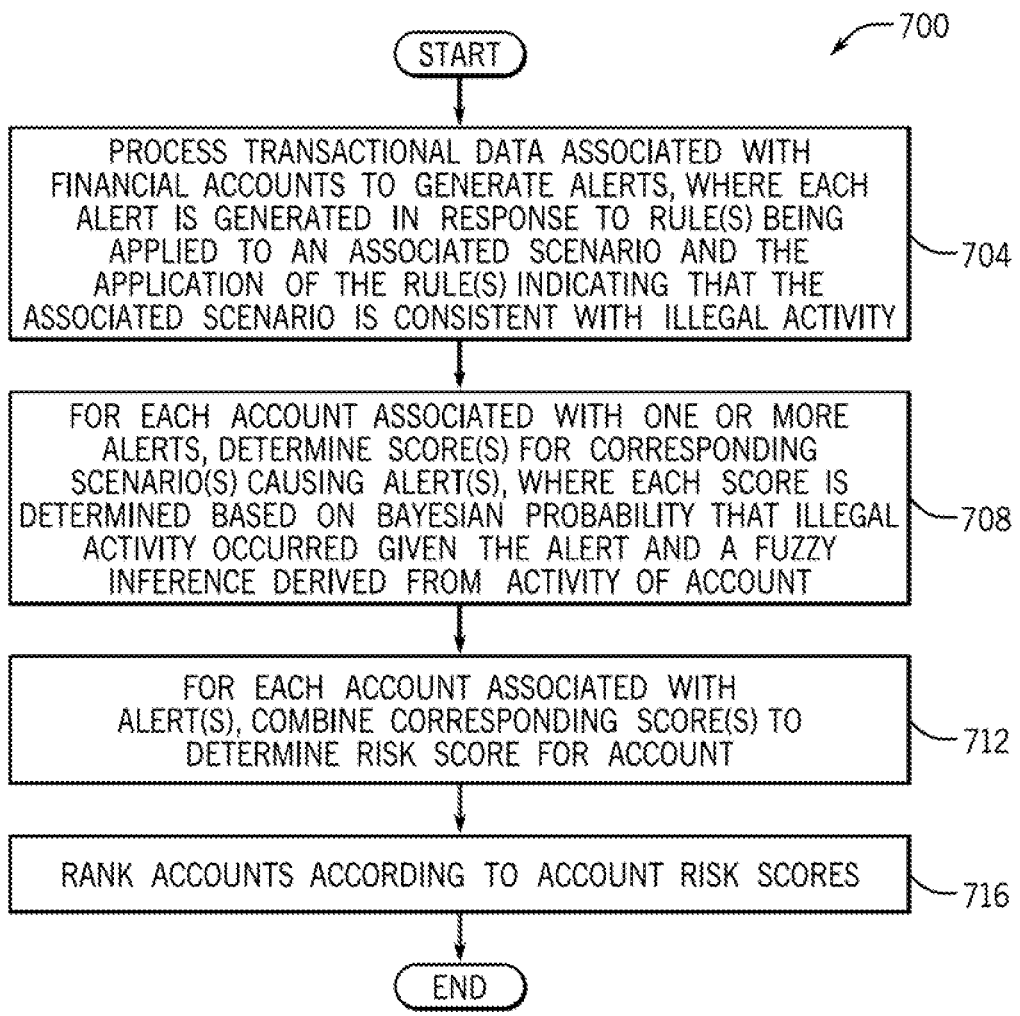
FIG. 7 is a flow diagram depicting a fuzzy inference-based technique to rank financial accounts according to risk for illegal activity according to an example implementation.

More specifically, the systems and techniques that are disclosed herein may be used to perform a technique 700 that is depicted in FIG. 7. Pursuant to the technique 700, transactional data associated with financial accounts may be processed (block 704) to generate alerts, where each alert is generated in response to one or more rules being applied to an associated scenario and the application of the rule(s) indicating that the associated scenario is consistent with illegal activity. Pursuant to the technique 700, for each account associated with one or more alerts, score(s) are determined for the corresponding scenario(s) causing the alert(s) pursuant to block 708, where each score is determined based on a Bayesian probability that illegal activity has occurred given the alert and a fuzzy inference that is derived from activity of the financial account. For each financial account that is associated with the alert(s), the corresponding score(s) are combined to determine a risk score for the account, pursuant to block 712. The accounts may then be ranked according to the account risk scores, pursuant to block 718.

Figure 8:
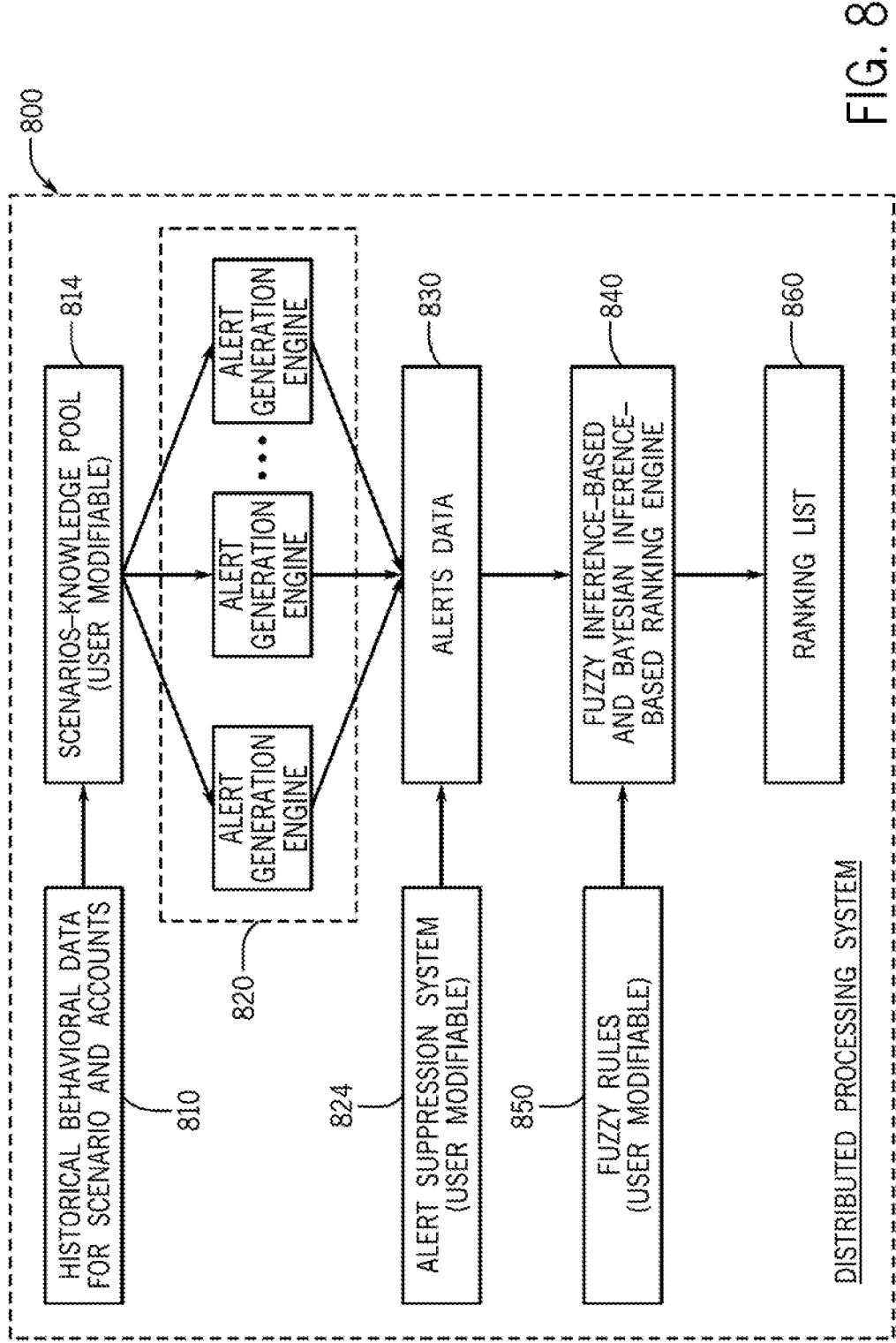
FIG. 8 is a schematic diagram of a distributed processing system to generate alerts and use fuzzy inference to rank financial accounts according to risk for illegal activity according to an example implementation.

Referring to FIG. 8, in accordance with some implementations, a distributed processing system 800 may be used for purposes of processing historical behavioral data 810 for scenarios and accounts and producing a ranking list 860 identifying an ordered list of accounts associated with a high likelihood of illegal activity. In general, the distributed processing system 800 may be quite beneficial in that the amount of everyday financial transactional data is ever-increasing, and the distributed processing system 800 provides a scalable and parallel processing approach to accommodate such relative high data volumes and data velocities. In accordance with some implementations, the distributed processing system may be a Hadoop-based file system and use a MapReduce programming model for purposes of processing the data.

More specifically, in accordance with example implementations, one or multiple alert generation engines 820 receive historical behavioral data 810 (representing account information and transaction data used for evaluating scenarios) and data 814 representing rules to apply to generate scenario alerts. In accordance with example implementations, the alert generation engines 820 operate in parallel for purposes of processing the transactions to identify scenarios consistent with illegal activity (as defined by the rules) and generate the corresponding alerts.

In accordance with some implementations, the alert generation engines 820 may include multiple, distributed alert generation engines 820, and each alert generation engine 820 may be a MapReduce engine that executes corresponding Map and Reduce functions to check the transaction data and generate alerts. For example, a given alert generation engine 820 may apply a rule that generates an alert if there are M occurrences of an account transaction exceeding a predefined threshold within a P day window. For this example, the Map function keeps count of all transactions that exceed the predefined threshold and the corresponding dates that these events happen, and the Reduce function processes these results to identify accounts for which M occurrences are within a P day window. It is noted that the Map and Reduce functions may perform alert generation for different and more sophisticated rules, in accordance with further example implementations. In general, if there are R scenarios to check and S engines 830 for each scenario, the distributed solution illustrated in FIG. 8 may increase the processing speed by R*S, unless limited by hardware.

As illustrated in FIG. 8, the corresponding alerts data 830 may be processed by a fuzzy inference-based and Bayesian inference based ranking engine 840. In accordance with some implementations, the engine 840 may also be a MapReduce engine. The engine 840 uses fuzzy rules 850 to determine the fuzzy inference for a given scenario as well as evaluate a Bayesian probability for purposes of determining scenario scores, as discussed herein. The engine 840 further generates account risk scores for purposes of generating an ordered ranking list 860 of the accounts.

As also illustrated in FIG. 8, in accordance with example implementations, the engine 840 may be provided data 824 representing alert suppression. In this manner, the weight of an account may be based on historical information for purposes of reducing the number of false positives. For example, if a user has chosen to suppress an alert for an account, related information (the account number, the threshold, the actual transaction amount, and other related information) is logged, and the weight of that account may then be reduced for purposes of computing the rank of the alert. Therefore, for an account for which alerts have been suppressed, the account may receive a lower rank, even though the account has deviated from the threshold significantly for one or more scenarios. In accordance with example implementations, over time, the system 800 learns the weight of each account and uses that information while ranking the accounts, which, overall, reduces the number of false positives overtime.

Figure 9:
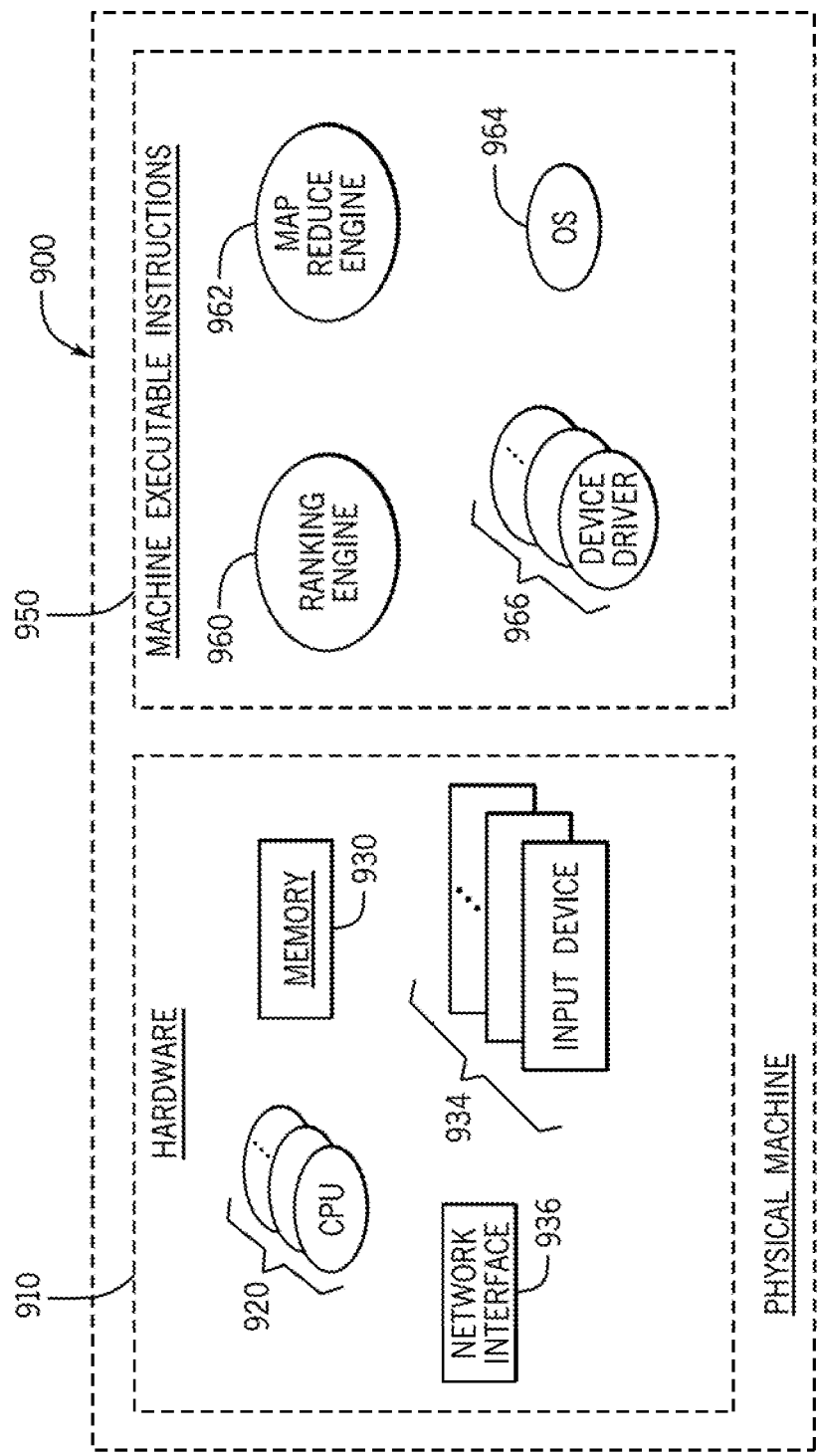
FIG. 9 is a schematic diagram of a physical machine according to an example implementation.

Referring to FIG. 9, in accordance with example implementations, the systems that are disclosed herein, such as systems 100 (FIG. 1) and 800 (FIG. 8), may use one or multiple physical machines, such as physical machine 900 of FIG. 9. In general, the physical machine 900 is an actual machine that is made up of actual hardware 910 and actual machine executable instructions 950, or "software." The hardware 910 may include, for example, one or multiple central processing units (CPUs) 920, and non-transitory storage devices, which collectively form one or more memories 930. In general, the storage devices may be formed from such non-transitory devices semiconductor storage devices, magnetic storage devices, phase change memory devices, memristors, optical storage devices, magnetic storage devices, and so forth. The hardware 910 may also include input devices 934, one or multiple network interfaces 936 as well as various other hardware devices, as can be appreciated.

The machine executable instructions 950 may include, for example, instructions that when executed by the CPU(s) 920 form one or multiple ranking engines 960 (e.g., ranking engine 120 (FIG. 1) or ranking engine 840 (FIG. 8), one or multiple MapReduce-based engines 962 (e.g., an alert generation 820 (FIG. 8) or ranking engine 840)), an operating system 964, one or multiple device drivers 966, one or multiple ranking or alert generation engines that are not Map-Reduce engines, and so forth.

Thus, in accordance with example implementations, one, multiple or all of the ranking and alert generation engines (MapReduce-based and non-MapReduce-based) may be software components, i.e., a component formed by at least one processor executing machine executable instructions, or software. In further example implementations, one, multiple or all of these engines may be constructed as a hardware component that is formed from dedicated hardware (one or more integrated circuits that contain logic configured to perform ranking, alert detection, and so forth). Thus, the engines that are described herein may take on one of many different forms and may be based on software and/or hardware, depending on the particular implementation.

While the present techniques have been described with respect to a number of embodiments, it will be appreciated that numerous modifications and variations may be applicable therefrom. It is intended that the appended claims cover all such modifications and variations as fall within the scope of the present techniques.

What is claimed is:

1. A method comprising:
receiving, by a processor, a plurality of alerts associated with a financial account, the plurality of alerts indicating that a plurality of scenarios have occurred for the financial account, wherein each scenario of the plurality of scenarios is associated with an illegal activity; and
in response to receiving the plurality of alerts:
for each scenario of the plurality of scenarios, the processor determining a score of the scenario using a fuzzy inference derived from activity of the financial account, the score of the scenario indicating a likelihood that the illegal activity associated with the scenario has occurred for the financial account.

2. The method of claim 1, wherein using the fuzzy inference comprises
applying an additional rule to determine a fuzzy value; and
determining the likelihood based at least in part on the fuzzy value.

3. The method of claim 2, wherein applying the additional rule to determine the fuzzy value comprises:
defining a membership function for a variable of the additional rule based at least in part on a user-specified deviation from a threshold of the additional rule; and
using the membership function to determine the fuzzy value.

4. The method of claim 2, wherein determining the likelihood comprises defuzzifying the fuzzy value to generate a factor, the method further comprising, for each alert of the plurality of alerts:
determining a Bayesian probability that the illegal activity occurred given the alert of the plurality of alerts; and
weighting the Bayesian probability with the factor to determine the likelihood that the illegal activity occurred.

5. The method of claim 4, further comprising determining a risk score for the financial account based at least in part on the weighted Bayesian probability.

6. The method of claim 1, further comprising:
generating the plurality of alerts via a plurality of distributed alert generation engines.

7. The method of claim 6, wherein each of the plurality of distributed alert generation engines comprises a MapReduce processing engine.

8. The method of claim 6, wherein each of the plurality of distributed alert generation engines is to process transactional data associated with a different scenario of the plurality of scenarios.

9. An article comprising a non-transitory storage medium readable by a processor-based system, the non-transitory storage medium storing instructions that when executed by the processor-based system, cause the processor-based system to:
apply a set of rules to scenarios associated with a financial account;
selectively designate the scenarios as being candidates consistent with potential illegal activity based at least in part on application of the set of rules; and
for each candidate scenario, generate a risk score based at least in part on a Bayesian probability that illegal activity occurred and a fuzzy inference that illegal activity occurred.

10. The article of claim 9, the non-transitory storage medium storing instructions that when executed by the processor-based system, cause the processor-based system to:
combine risk scores for the candidate scenarios to generate a risk score for the financial account.

11. The article of claim 9, the non-transitory storage medium storing instructions that when executed by the processor-based system, cause the processor-based system to, for at least one of the candidate scenarios:
apply at least one fuzzy rule to the candidate scenario to generate a fuzzy inference factor; and
weight the Bayesian probability that the illegal activity occurred with the candidate scenario with the fuzzy inference factor to generate the risk score for the candidate scenario.

12. The article of claim 11, the non-transitory storage medium storing instructions that when executed by the processor-based system, cause the processor-based system to:
for the at least one fuzzy rule, assign at least one membership function, a high risk function and a low risk function;
perform the fuzzy inference based at least in part on the at least one membership function, the high risk function and the low risk function to generate a fuzzy value representing a likelihood that illegal activity occurred; and
perform defuzzification of the fuzzy value to generate the fuzzy inference factor.

13. The article of claim 12, the non-transitory storage medium storing instructions that when executed by the processor-based system, cause the processor-based system to:
construct the at least one membership function based at least in part on a user-specified deviation from a threshold defined by the at least one fuzzy rule.

14. The article of claim 9, the non-transitory storage medium storing instructions that when executed by the processor-based system, cause the processor-based system to:
generate a plurality of alerts based on the set of rules applied to the scenarios.

15. The article of claim 14, wherein the plurality of alerts are generated via a plurality of distributed alert generation engines, and wherein each of the plurality of distributed alert generation engines comprises a MapReduce processing engine.

16. A system comprising:
a processor implemented in hardware; and
a non-transitory storage medium storing instructions executable by the processor to execute:

an alert generation engine to process transactional data associated with a financial account to generate a plurality of alerts, the plurality of alerts indicating that a plurality of scenarios have occurred for the financial account, wherein each scenario of the plurality of scenarios is associated with an illegal activity; and a ranking engine to, for each scenario of the plurality of scenarios, determine a score of the scenario based at least in part on fuzzy inferences derived from activities of the financial account, the score of the scenario indicating a likelihood that the illegal activity associated with the scenario has occurred for the financial account.

17. The system of claim 16, wherein the alert generation engine is one of a plurality of distributed alert generation engines, the plurality of distributed alert generation engines being grouped according to different financial scenarios such that the plurality of distributed alert generation engines of each group process the transactional data for a different scenario.

18. The system of claim 16, wherein the alert generation engine comprises a MapReduce processing engine.

19. The system of claim 16, wherein the ranking engine further ranks the financial account within a group of financial accounts based at least in part on Bayesian inferences derived from the activities of the financial account.

20. The system of claim 16, wherein the ranking engine generates a risk score for the financial account based at least in part on the fuzzy inferences, determines a ranking of the financial account based at least in part on the risk score, and adapts the ranking based at least in part on user specified data representing financial accounts for which false results have historically occurred.

\* \* \* \* \*